United States Patent
Wu et al.

(10) Patent No.: US 12,405,111 B2
(45) Date of Patent: Sep. 2, 2025

(54) RESONATOR OPTICAL GYROSCOPES WITH DUAL BROADBAND LIGHT SOURCES

(71) Applicant: Honeywell International Inc., Charlotte, NC (US)

(72) Inventors: Jianfeng Wu, Tucson, AZ (US); Tiequn Qiu, Glendale, AZ (US); Glen A. Sanders, Scottsdale, AZ (US); Steven Tin, Edina, MN (US); Matthew Wade Puckett, Phoenix, AZ (US)

(73) Assignee: Honeywell International Inc., Charlotte, NC (US)

( * ) Notice: Subject to any disclaimer, the term of this patent is extended or adjusted under 35 U.S.C. 154(b) by 257 days.

(21) Appl. No.: 18/348,169

(22) Filed: Jul. 6, 2023

(65) Prior Publication Data
US 2025/0012572 A1    Jan. 9, 2025

(51) Int. Cl.
*G01C 19/72* (2006.01)
*G01C 19/64* (2006.01)

(52) U.S. Cl.
CPC .......... *G01C 19/727* (2013.01); *G01C 19/64* (2013.01); *G01C 19/72* (2013.01); *G01C 19/722* (2013.01)

(58) Field of Classification Search
CPC ...... G01C 19/727; G01C 19/64; G01C 19/72; G01C 19/722; G01C 19/661
See application file for complete search history.

(56) References Cited

U.S. PATENT DOCUMENTS

| | | | |
|---|---|---|---|
| 7,142,355 B2 | 11/2006 | Huang et al. | |
| 7,515,271 B2 | 4/2009 | Greening et al. | |
| 8,077,322 B2 | 12/2011 | Strandjord et al. | |
| 8,208,503 B2 | 6/2012 | Qiu et al. | |
| 9,772,189 B2 * | 9/2017 | Strandjord | G01C 19/662 |

(Continued)

FOREIGN PATENT DOCUMENTS

EP    1125346 B1    6/2002

OTHER PUBLICATIONS

European Patent Office, "Extended European Search Report", dated Nov. 4, 2024, from EP Application No. 24170452.7, from Foreign Counterpart to U.S. Appl. No. 18/348,169, pp. 1 through 12, Published: EP.

*Primary Examiner* — Jonathan M Hansen
(74) *Attorney, Agent, or Firm* — Fogg & Powers LLC

(57) ABSTRACT

A gyroscope comprises first and second light sources that emit first and second beams with broadband spectrums, and a waveguide arrangement that communicates with the light sources. A resonator communicates with the waveguide arrangement to receive the beams. A first circulator is coupled to the waveguide arrangement between the first light source and the resonator. A second circulator is coupled to the waveguide arrangement between the second light source and the resonator. A first rate detector communicates with the resonator through the first circulator, and a second rate detector communicates with the resonator through the second circulator. The rate detectors produce rate measurements based on a detected resonance frequency shift of the beams in the resonator caused by rotation of the gyroscope. Outputs of the rate detectors are used to calculate a rotation rate that is corrected for errors due to a time varying pathlength change in the resonator.

20 Claims, 2 Drawing Sheets

(56) References Cited

U.S. PATENT DOCUMENTS

| | | |
|---|---|---|
| 11,199,407 B2 | 12/2021 | Paniccia et al. |
| 2002/0154385 A1 | 10/2002 | Flaquier et al. |
| 2018/0328732 A1* | 11/2018 | Sanders ............... H01S 5/1071 |
| 2020/0158506 A1* | 5/2020 | Rochus ............... G01C 19/662 |
| 2021/0055108 A1* | 2/2021 | Strandjord ........... G01C 19/721 |
| 2021/0240050 A1 | 8/2021 | Khan |
| 2024/0328783 A1* | 10/2024 | Wu ....................... H01S 3/0071 |

\* cited by examiner

RESONATOR OPTICAL GYROSCOPES WITH DUAL BROADBAND LIGHT SOURCES

STATEMENT REGARDING FEDERALLY SPONSORED RESEARCH OR DEVELOPMENT

This invention was made with Government support under FA9453-20-C-0013 awarded by Air Force Research Laboratory. The Government has certain rights in the invention.

BACKGROUND

The resonant optical gyroscope often requires narrow linewidth lasers for rate interrogation. One or multiple narrow linewidth lasers can be used to lock to the cavity resonances in the gyroscope. The rotation rate is determined by comparing the resonance shift between clockwise (CW) and counterclockwise (CCW) beam directions. However, such gyroscope systems are expensive and complicated. In addition, the system bias performance is limited by the Kerr effect. The Kerr effect is caused by the different phase shifts between counter propagating beams due to the self-phase modulation (SPM) and cross-phase modulation (XPM), and is more prominent with narrow linewidth lasers.

The Kerr effect becomes even more significant for integrated photonics gyroscopes. Due to their small scale factor, integrated photonics gyroscopes have very high finesses to reduce the cavity linewidth and increase the gyroscope sensitivity. Therefore, the intracavity intensity in integrated photonics gyroscopes is much higher than the intensity in traditional resonant fiber optical gyroscopes (RFOGs).

In addition, prior approaches for resonant optical gyroscopes rely on narrow linewidth lasers and resonance locking loops for rate detection, which is complicated and expensive. While broadband-based RFOGs can significantly reduce system complexity and cost, these systems have an inherent nonreciprocity.

SUMMARY

A gyroscope comprises a first light source configured to emit a first light beam with a broadband spectrum, and a second light source configured to emit a second light beam with a broadband spectrum. A first waveguide arrangement is in optical communication with the first and second light sources. An optical resonator, having a first side and an opposing second side, is in optical communication with the first waveguide arrangement on the first side. The optical resonator is configured to receive the first and second light beams through the first waveguide arrangement. A second waveguide arrangement is in optical communication with the optical resonator on the second side thereof. A first phase modulator is in optical communication with the optical resonator through the second waveguide arrangement, and a first reflector is optically coupled with the first phase modulator. A second phase modulator is in optical communication with the optical resonator through the second waveguide arrangement, and a second reflector is optically coupled with the second phase modulator. A first optical circulator is optically coupled to the first waveguide arrangement between the first light source and the first side of the optical resonator. A second optical circulator is optically coupled to the first waveguide arrangement between the second light source and the first side of the optical resonator. A first rate detector is in optical communication with the optical resonator through the first optical circulator, and a second rate detector is in optical communication with the optical resonator through the second optical circulator. The first and second rate detectors are operative to produce respective first and second rate measurements based on a detected resonance frequency shift of the beams in the optical resonator caused by rotation of the gyroscope. The outputs of the first and second rate detectors are used to calculate a rotation rate that is corrected for errors due to a time varying pathlength change in the optical resonator.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail using the accompanying drawings, in which.

DETAILED DESCRIPTION

Figure 1:
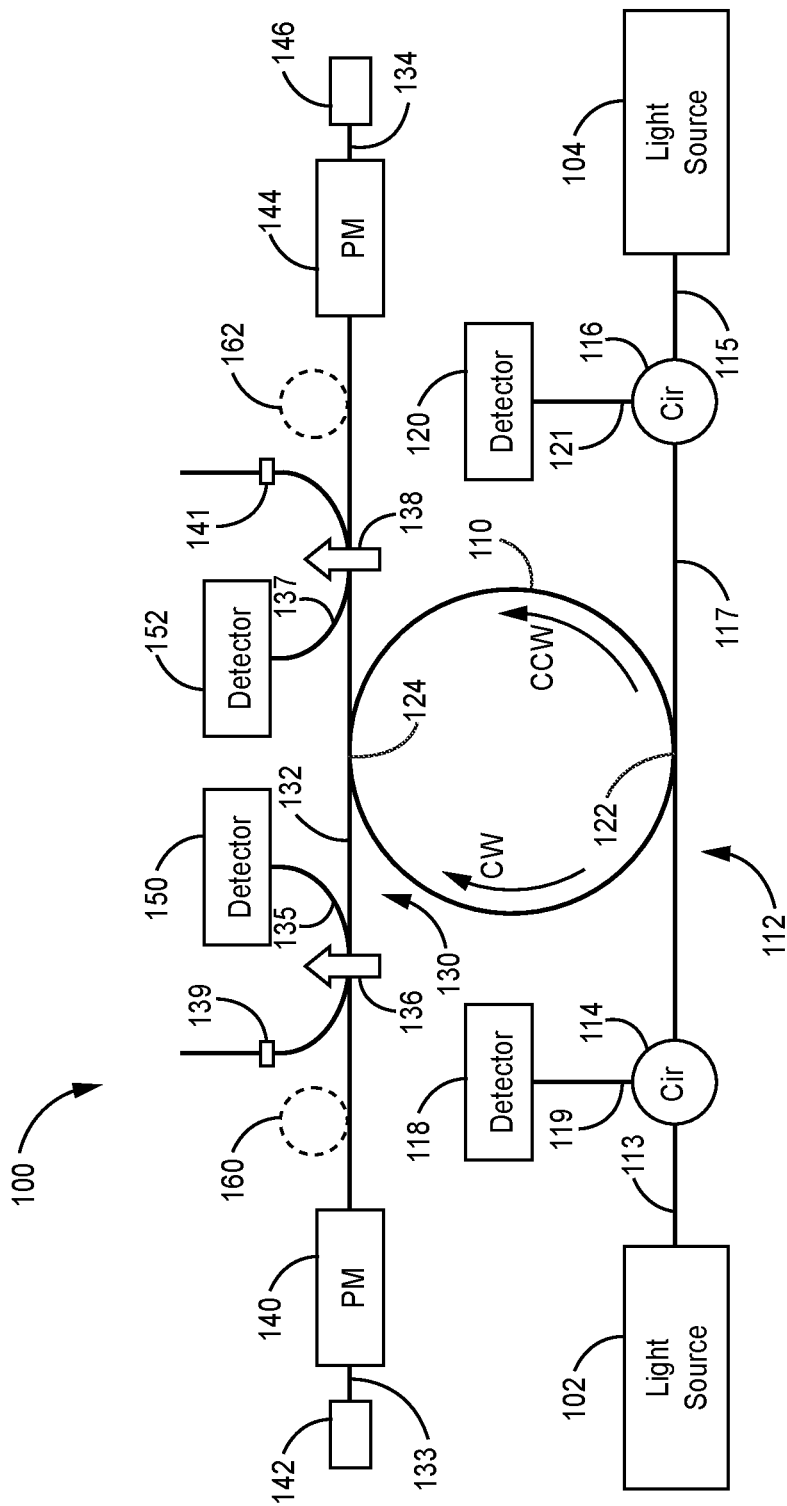
FIG. 1 is a schematic diagram of a resonator optical gyroscope, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Various embodiments of resonator optical gyroscopes with dual broadband light sources are described herein.

The present approach provides for reducing nonreciprocity in resonant optical gyroscopes by using a dual light source system. This system can be implemented in a resonator fiber optical gyroscope (RFOG) or in a waveguide resonator optical gyroscope such as an integrated photonics gyroscope.

Intensity-based resonator optical gyroscopes using broadband light sources can significantly reduce the Kerr effect. These gyroscopes measure the resonance shift between CW and CCW beams due to rotation by comparing the intensity difference between the CW and CCW beam transmissions. For example, in such systems, the light is launched into the CW direction first in the resonator, and then, the transmitted beam gets reflected and launched back into the resonator in the CCW direction. Since the CW and CCW resonance peaks are separated due to the Sagnac effect, the double-pass beam intensity varies with the rotation rate. However, such systems have a reciprocity issue, because the light passing between the CW and CCW directions is not truly reciprocal in such time-variant systems, so-called "bias errors due to time varying resonator pathlength". These errors are essentially time-varying changes in the resonator pathlength that would be common to clockwise and counterclockwise resonant lightwaves inside a ring resonator if the lightwaves were introduced to the resonator at the same time. But, in this single-light-source architecture, CW and CCW lightwaves are introduced at different times, making an otherwise common pathlength change into a observed differential pathlength for CW and CCW beams. This differential pathlength manifests as a difference in resonance frequencies experienced between the broadband-lightwave components that propagated in the CW direction and the broadband-lightwave components that propagated in the CCW direction. This gives a gyroscope output that is indistinguishable from that due to rotation rate, i.e., or a rotation-rate bias error (hereafter called "$bias_{common}$", having the same units as rotation rate).

If the gyroscope is at rest, the CW and CCW beam transmissions overlap with each other, and there is no additional transmission loss due to double-pass through the resonator. If the gyroscope is under rotation, the CW and CCW resonance separates. Therefore, the back-reflected CW beam gets attenuated in the CCW transmission direction. The additional intensity reduction is proportional to the rotation rate. Since the CCW and CW beams pass through the gyroscope resonator at different times, any change in the gyroscope cavity within the time delay introduces bias error.

In the present approach, the use of dual light sources solves the above reciprocity issue. Each light source can measure the rotation rate individually. The two light sources are configured to measure the rotation rate with an opposite sign. The CW beam from one light source and the CCW beam from the other light source pass through the resonator simultaneously. Output signals from most bias errors are common, but the output signal component from rotation rate is not—it has the opposite sign between the two light sources. Therefore, bias errors can be eliminated by common error subtraction while retaining the desired signal from rotation rate.

There are different ways to measure the rate using dual detectors for the respective dual light sources, to avoid interference between signals generated by the two light sources and backscatter, which is also generated by the signal light waves traveling in the resonator. In one approach, the CW and CCW beams are respectively modulated at different frequencies using a pair of phase modulators. In another approach, the dual light sources can be switched on and off using a fast switching scheme, such that the rate measurements are separated by time. In a further approach, the dual light sources are configured to emit beams having different wavelengths, and optical filters are used to separate the different wavelengths from each other.

Further details regarding the present approach are described as follows and with reference to the drawings.

FIG. 1 is a schematic illustration of a resonator optical gyroscope 100, according to one embodiment. The gyroscope 100 generally includes a first light source 102 configured to emit a first light beam with a broadband spectrum, a second light source 104 configured to emit a second light beam with a broadband spectrum, and an optical resonator 110 in optical communication with the first and second light sources 102, 104. The optical resonator 110 is in optical communication with first and second light sources 102, 104, as well as various other optical components, through an optical pathway comprising optical fibers, planar waveguides, or combinations thereof.

In some embodiments, the first and second light sources 102, 104 can be amplified spontaneous emission (ASE) devices, such as rare-earth doped fiber amplifiers or superluminescent diode (SLD) devices, which are configured to emit light beams with a broadband spectrum. The optical resonator 110 can be implemented as a fiber ring resonator, or as a planar waveguide ring resonator, for example. The various optical components of gyroscope 100 can be connected though the optical fibers, or can be integrated on a single photonics chip using the planar waveguides.

As shown in FIG. 1, a first waveguide arrangement 112 is optically coupled with first and second light sources 102, 104, and with optical resonator 110. The first waveguide arrangement 112 is configured to propagate the first light beam from first light source 102 in a first direction, and to counter-propagate the second light beam from second light source 104 in an opposite second direction. The first waveguide arrangement 112 can be implemented with optical fibers, planar waveguides, or combinations thereof.

A first optical circulator 114 is optically coupled to first waveguide arrangement 112 between an output of first light source 102 and a first coupler region 122 on a first side of optical resonator 110. A second optical circulator 116 is optically coupled to first waveguide arrangement 112 between an output of second light source 104 and first coupler region 122. A first rate detector 118 is in optical communication with optical resonator 110 through first optical circulator 114. A second rate detector 120 is in optical communication with optical resonator 110 through second optical circulator 116. The first and second rate detectors 118, 120 are operative to produce respective first and second rate measurements based on a detected resonance frequency shift of the beams in optical resonator 110 caused by rotation of gyroscope 100.

In one implementation, first waveguide arrangement 112 comprises a first input waveguide 113 optically coupled between an output of first light source 102 and a first port of first optical circulator 114, and a second input waveguide 115 optically coupled between an output of second light source 104 and a first port of second optical circulator 116. A first bus waveguide 117 is optically coupled between a second port of first optical circulator 114 and a second port of second optical circulator 116. The first bus waveguide 117 is also optically coupled to optical resonator 110 at first coupler region 122. A first output waveguide 119 is optically coupled between a third port of first optical circulator 114 and an input of first rate detector 118. A second output waveguide 121 is optically coupled between a third port of second optical circulator 116 and an input of second rate detector 120.

In addition, a second waveguide arrangement 130 is optically coupled with optical resonator 110 at a second coupler region 124 on an opposing second side of optical resonator 110. A first phase modulator 140 is in optical communication with optical resonator 110 through second waveguide arrangement 130. A first reflector 142 is optically coupled with first phase modulator 140. The first reflector 142 is in optical communication with optical resonator 110 through second waveguide arrangement 130 and first phase modulator 140. A second phase modulator 144 is also in optical communication with optical resonator 110 through second waveguide arrangement 130. A second reflector 146 is optically coupled with second phase modulator 144. The second reflector 146 is in optical communication with optical resonator 110 through second waveguide arrangement 130 and second phase modulator 144. The first and second reflectors 142, 146 can be Bragg gratings, loop mirrors, or edge high reflective (HR) coatings on a waveguide edge, for example.

A first intensity detector 150 is optically coupled to second waveguide arrangement 130, and a second intensity detector 152 is also optically coupled to second waveguide arrangement 130. As described further hereafter, first and second intensity detectors 150, 152 are configured to respectively monitor the power of beams reflected from first and second reflectors 142, 146.

In one implementation, second waveguide arrangement 130 comprises a second bus waveguide 132 that is optically coupled between first phase modulator 140 and second phase modulator 144. The second bus waveguide 132 is optically coupled to optical resonator 110 at second coupler region 124. A first connecting waveguide 133 is optically coupled between first phase modulator 140 and first reflector 142. A second connecting waveguide 134 is optically coupled between second phase modulator 144 and second reflector 146. The second bus waveguide 132 is also optically coupled to a first coupling waveguide 135 by a first polarizing coupler 136. The first coupling waveguide 135 is optically coupled to an input of first intensity detector 150. The first coupling waveguide 135 is also optically coupled to a first beam stop 139. The second bus waveguide 132 is also optically coupled to a second coupling waveguide 137 by a second polarizing coupler 138. The second coupling waveguide 137 is optically coupled to an input of second intensity detector 152. The second coupling waveguide 137 is also optically coupled to a second beam stop 141.

In some embodiments, a first low frequency phase modulator 160 and a second low frequency phase modulator 162 can be optically coupled to second waveguide arrangement 130. For example, first low frequency phase modulator 160 can be optically coupled to second bus waveguide 132 between first phase modulator 140 and first polarizing coupler 136. The second low frequency phase modulator 162 can be optically coupled to second bus waveguide 132 between second phase modulator 144 and second polarizing coupler 138. The first and second low frequency phase modulators 160, 162 are configured to scramble the phase in order to reduce the bias due to parasitic interference, for example, due to unwanted backreflected light. In some embodiments, microheaters can be used as low frequency phase modulators 160, 162 to provide low frequency phase modulation.

During operation of gyroscope 100, first light source 102 emits a first light beam that is directed by first input waveguide 113 in a first direction to the first port of first optical circulator 114. The first light beam is directed into first bus waveguide 117 from the second port of first optical circulator 114. A portion of the first light beam in first bus waveguide 117 is optically coupled into optical resonator 110 and propagates in a counterclockwise (CCW) direction as a CCW beam. A beam portion of the CCW beam in optical resonator 110 is optically coupled into second bus waveguide 132 at second coupler region 124. This beam portion is directed by second bus waveguide 132 to first phase modulator 140, which provides a phase modulation or frequency shift to the beam portion. The first phase modulator 140 transmits the beam portion to first reflector 142 through first connecting waveguide 133. The first reflector 142 reflects the beam portion back as a first reflected beam through first connecting waveguide 133, to first phase modulator 140, and into second bus waveguide 132.

A portion of the first reflected beam is optically coupled at second coupler region 124 into optical resonator 110 in a CW direction as a CW beam. Another portion of the first reflected beam in second bus waveguide 132 is tapped into first coupling waveguide 135 by first polarizing coupler 136 and directed to first intensity detector 150, which monitors the power of the first reflected beam.

The CW beams circulating in optical resonator 110 are coupled out of optical resonator 110 into first bus waveguide 117 at first coupler region 122 and directed to first optical circulator 114. The CW beams are output from the third port of first optical circulator 114 into first output waveguide 119, which directs the CW beams to first rate detector 118 for further processing.

In addition, second light source 104 emits a second light beam that is directed by second input waveguide 115 in a second direction to the first port of second optical circulator 116. The second light beam is directed into first bus waveguide 117 from the second port of second optical circulator 116. A portion of the second light beam in first bus waveguide 117 is optically coupled into optical resonator 110 and propagates in a clockwise (CW) direction as a CW beam. A beam portion of the CW beam in optical resonator 110 is optically coupled into second bus waveguide 132 at second coupler region 124. This beam portion is directed by second bus waveguide 132 to second phase modulator 144, which provides a phase modulation or frequency shift to the beam portion. The second phase modulator 144 transmits the beam portion to second reflector 146 through second connecting waveguide 134. The second reflector 146 reflects the beam portion back as a second reflected beam through second connecting waveguide 134, to second phase modulator 144, and into second bus waveguide 132.

A portion of the second reflected beam is optically coupled at second coupler region 124 into optical resonator 110 in a CCW direction as a CCW beam. Another portion of the second reflected beam in second bus waveguide 132 is tapped into second coupling waveguide 137 by second polarizing coupler 138 and directed to second intensity detector 152, which monitors the power of the second reflected beam.

The CCW beams circulating in optical resonator 110 are coupled out of optical resonator 110 into first bus waveguide 117 at first coupler region 122 and directed to second optical circulator 116. The CCW beams are output from the third port of second optical circulator 116 into second output waveguide 121, which directs the CCW beams to second rate detector 120 for further processing.

After the CW and CCW beams have passed through optical resonator 110, each of the CW and CCW beams acquires a phase shift due to resonator delay. The CW and CCW beams have different phase shifts due to the Sagnac effect. The rotation of gyroscope 100 causes a resonance frequency shift between the CW and CCW beams output by optical resonator 110, which is detected by first and second rate detectors 118, 120. A rate calculation unit can be used to calculate a rotation rate for gyroscope 100 based on received signals from first and second rate detectors 118, 120. The outputs of first and second rate detectors 118, 120 can be used to calculate a rotation rate that is corrected for errors due to a time varying pathlength change in optical resonator 110, as described further hereafter.

Each of first and second light sources 102, 104 can be used to measure the rotation rate individually. The first and second light sources 102, 104 are configured to measure the rotation rate with an opposite sign. For example, the CW beam from one light source and the CCW beam from the other light source pass through optical resonator 110 simultaneously. Most bias errors due to time-varying resonator pathlength changes (due to temperature, strain, vibration, etc.) are common except for the rotation rate, which has the opposite sign between the two light source-generated signals. Therefore, bias errors can be eliminated by common error subtraction.

In order to measure the total rate for gyroscope 100 using first and second rate detectors 118, 120, interference between the desired output signal generated by the first light source and backreflected light generated in the second light source needs to be avoided. Likewise, interference between the desired output signal generated by the second light source and backreflected light generated in the first light source also needs to be avoided. In one approach to avoid such interference, the CW and CCW beams are respectively modulated at different frequencies using first phase modulator 140 and second phase modulator 144. For example, the first CCW beam can be modulated at a first frequency by first phase modulator 140, and the first CW beam can be modulated at a second frequency by second phase modulator 144, with the second frequency being different than the first frequency. For example, the first frequency can be about 23 kHz, and the second frequency can be about 17 kHz. The indicated rate for a signal generated by the first light source only, in this example, is the demodulated output of rate detector 118, which is demodulated at the first frequency (e.g., about 23 kHz) using a demodulator (not shown). The indicated rate for a signal generated by the second light source only, in this example, is the demodulated output of rate detector 120, which is demodulated at the second frequency (e.g., about 17 kHz) using a demodulator (not shown).

To recover rotation rate magnitude and direction, the following method can be used. The demodulated signal ($Vdem_{118}$) from rate detector 118 is linearly proportional to the rotation rate, $\Omega$, with a positive slope. The amplitude of the demodulated signal ($Vdem_{118}$) is proportional to the rotation rate, while its sign indicates the direction of the rotation for signals from the first light source. This can be expressed as $Vdem_{118}=(bias_{common}+\Omega)/k$, where k is a scale factor. The demodulated signal ($Vdem_{120}$) from rate detector 120 is linearly proportional to the rotation rate, $\Omega$, with a negative slope. The amplitude of the demodulated signal ($Vdem_{120}$) is proportional to the rotation rate, while its sign indicates the direction of the rotation for signals from the second light source. Because the first light source 102 and the second light sources 104 are launched into the resonator in opposite directions, their rate measurement sign is flipped. Compared to the demodulated sign $Vdem_{118}$, the demodulated signal from rate detector 120 measures the same common bias, but the sign of the rate bias is flipped. This can be expressed as $Vdem_{120}=(bias_{common}-\Omega)/k$. The rotation rate can be calculated by $k*(Vdem_{118}-Vdem_{120})/2$, where k is a scale factor. The common bias noise can be calculated by $(Vdem_{118}+Vdem_{120})/2$. This calculation works for the open loop operation where the demodulated signal is used as rate output. But a similar approach works for a close loop operation as well.

For the close loop operation, the demodulated signal is used as an error signal to adjust the frequency of each return beam to keep them on resonance. Therefore, the frequencies of the feedback signals ($f_{102}$, $f_{104}$) indicates the average resonance frequency shifts between CW and CCW portions of each light source signals. Like the open loop operation, the rate for the close loop operation can be calculated by subtracting the rate measurements from two opposite light sources: $f_{Rate}=SF*(f_{102}-f_{104})/2$, where SF is the scale factor. The frequencies of the return beams can be adjusted via using a sawtooth waveform applied to each phase modulator, i.e., the well-known serrodyne technique; or acousto-optic frequency shifters may be applied.

In another approach to avoid interference between the first and second rate detectors 118, 120, the light sources can be switched on and off using a fast switching scheme, such that the first and second rate measurements are separated by time. For example, first and second light sources 102, 104 can be configured to separately switch on and off at different times, such that the rate measurements produced from first and second rate detectors 118, 120 are separated by time (e.g., less than about 1 ms).

Figure 2:
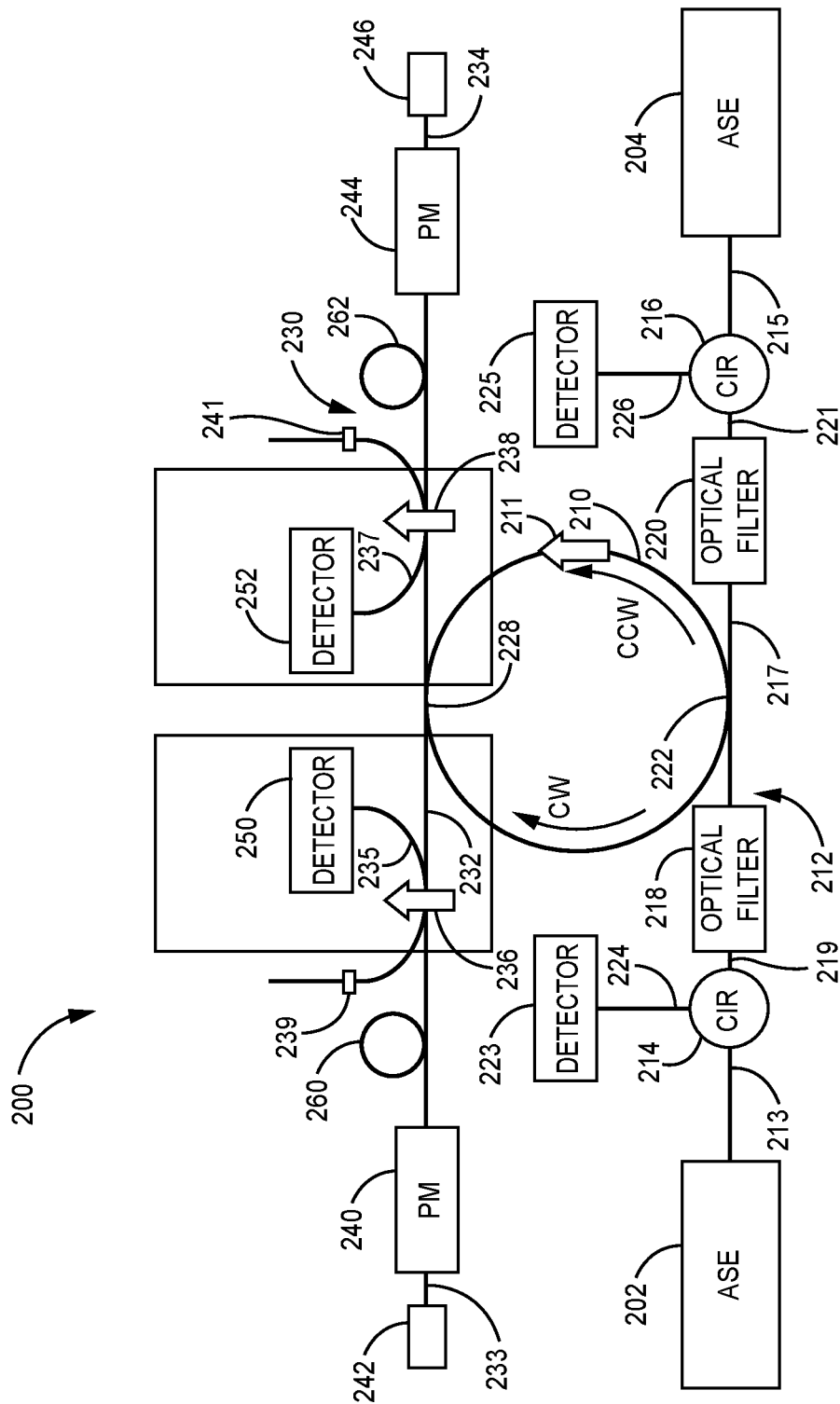
FIG. 2 is a schematic diagram of a resonator optical gyroscope, according to another embodiment.

In a further approach, the broadband light sources are configured to emit light beams having different wavelengths, and optical filters are used to separate the different wavelengths from each other. For example, FIG. 2 is a schematic illustration of a resonator optical gyroscope 200, according to another embodiment, which takes this approach.

The gyroscope 200 generally includes a first broadband light source 202, a second broadband light source 204, and an optical resonator 210. The optical resonator 210 is in optical communication with first and second broadband light sources 202, 204, as well as various other optical components, through an optical pathway comprising optical fibers, planar waveguides, or combinations thereof. The various optical components of gyroscope 200 can be connected though the optical fibers or can be integrated on a single photonics chip using the planar waveguides.

The optical resonator 210 can be implemented as a fiber ring resonator, or as a planar waveguide ring resonator, for example. In one embodiment, optical resonator 210 can include an optical polarizer 211 to suppress polarization bias error.

The first broadband light source 202 is configured to emit a first light beam at a first wavelength spectrum, and second broadband light source 204 is configured to emit a second light beam at a second wavelength spectrum that is different than the first wavelength spectrum. In some embodiments, the first and second broadband light sources 202, 204 can be ASE devices, such as SLD devices, which are configured to emit light beams with a broadband spectrum.

As shown in FIG. 2, a first waveguide arrangement 212 is optically coupled with first and second broadband light sources 202, 204, and with optical resonator 210. The first waveguide arrangement 212 is configured to propagate a first light beam from first broadband light source 202 in a first direction, and to counter-propagate a second light beam from second broadband light source 204 in an opposite second direction. The first waveguide arrangement 212 can be implemented with optical fibers, planar waveguides, or combinations thereof.

A first optical circulator 214 is optically coupled to first waveguide arrangement 212 and optically communicates with first broadband light source 202. A second optical circulator 216 is optically coupled to first waveguide arrangement 212 and optically communicates with second broadband light source 204.

A first optical filter 218 is optically coupled to first waveguide arrangement 212 between first optical circulator 214 and a first coupler region 222 on a first side of optical resonator 210. A second optical filter 220 is optically coupled to first waveguide arrangement 212 between second optical circulator 216 and first coupler region 222. As described further hereafter, the second optical filter 220 is configured to filter out the first light beam at the first wavelength spectrum from first broadband light source 202, and first optical filter 218 is configured to filter out the second light beam at the second wavelength spectrum from second broadband light source 204.

A first rate detector 223 is in optical communication with optical resonator 210 through first optical circulator 214 and first optical filter 218. A second rate detector 225 is in optical communication with optical resonator 210 through second optical circulator 216 and second optical filter 220.

In one implementation, first waveguide arrangement 212 comprises a first input waveguide 213 optically coupled between first broadband light source 202 and a first port of first optical circulator 214, and a second input waveguide 215 optically coupled between second broadband light source 204 and a first port of second optical circulator 216. A first bus waveguide 217 is optically coupled between first optical filter 218 and second optical filter 220. The first bus waveguide 217 is also optically coupled to optical resonator 210 at first coupler region 222. A first connecting waveguide 219 is optically coupled between a second port of first optical circulator 214 and first optical filter 218. A second connecting waveguide 221 is optically coupled between a second port of second optical circulator 216 and second optical filter 220. A first output waveguide 224 is optically coupled between a third port of first optical circulator 214 and first rate detector 223. A second output waveguide 226 is optically coupled between a third port of second optical circulator 216 and second rate detector 225.

In addition, a second waveguide arrangement 230 is optically coupled with optical resonator 210 at a second coupler region 228 on a second side of optical resonator 210. A first phase modulator 240 is in optical communication with optical resonator 210 through second waveguide arrangement 230. A first reflector 242 is optically coupled with first phase modulator 240. The first reflector 242 is in optical communication with optical resonator 210 through second waveguide arrangement 230 and first phase modulator 240. A second phase modulator 244 is also in optical communication with optical resonator 210 through second waveguide arrangement 230. A second reflector 246 is optically coupled with second phase modulator 244. The second reflector 246 is in optical communication with optical resonator 210 through second waveguide arrangement 230 and second phase modulator 244. The first and second reflectors 242, 246 can be Bragg gratings, loop mirrors, or edge HR coatings on a waveguide edge, for example.

A first intensity detector 250 is optically coupled to second waveguide arrangement 230 and a second intensity detector 252 is also optically coupled to second waveguide arrangement 230. As described further hereafter, first and second intensity detectors 250, 252 are configured to respectively monitor the power of beams reflected from first and second reflectors 242 and 246.

In one implementation, second waveguide arrangement 230 comprises a second bus waveguide 232 that is optically coupled between first phase modulator 240 and second phase modulator 244. The second bus waveguide 232 is optically coupled to optical resonator 210 at second coupler region 228. A first connector waveguide 233 is optically coupled between first phase modulator 240 and first reflector 242. A second connector waveguide 234 is optically coupled between second phase modulator 244 and second reflector 246. The second bus waveguide 232 is also optically coupled to a first coupling waveguide 235 by a first polarizing coupler 236. The first coupling waveguide 235 is optically coupled to first intensity detector 250. The first coupling waveguide 235 is also optically coupled to a first beam stop 239. The second bus waveguide 232 is also optically coupled to a second coupling waveguide 237 by a second polarizing coupler 238. The second coupling waveguide 237 is optically coupled to second intensity detector 252. The second coupling waveguide 237 is also optically coupled to a second beam stop 241.

In some embodiments, a first low frequency phase modulator 260 and a second low frequency phase modulator 262 are optically coupled to second waveguide arrangement 230. For example, first low frequency phase modulator 260 can be optically coupled to second bus waveguide 232 between first phase modulator 240 and first polarizing coupler 236. The second low frequency phase modulator 262 can be optically coupled to second bus waveguide 232 between second phase modulator 244 and second polarizing coupler 238. The first and second low frequency phase modulators 260, 262 are configured to scramble the phase in order to reduce the bias due to parasitic interference.

During operation of gyroscope 200, first broadband light source 202 emits a first light beam that is directed by first input waveguide 213 to the first port of first optical circulator 214. The first light beam is directed from the second port of first optical circulator 214 to first connecting waveguide 219, first optical filter 218, and first bus waveguide 217. A portion of the first light beam in first bus waveguide 217 is optically coupled into optical resonator 210 and propagates in a CCW direction as a first CCW beam. A beam portion of the CCW beam in optical resonator 210 is optically coupled into second bus waveguide 232 at second coupler region 228. This beam portion is directed by second bus waveguide 232 to first phase modulator 240, which provides a phase modulation or frequency shift to the beam portion. The first phase modulator 240 transmits the beam portion to first reflector 242 through first connector waveguide 233. The first reflector 242 reflects the beam portion back as a first reflected beam through first connector waveguide 233, to first phase modulator 240, and into second bus waveguide 232.

A portion of the first reflected beam is optically coupled at second coupler region 228 into optical resonator 210 in a CW direction as a second CW beam. Another portion of the first reflected beam in second bus waveguide 232 is tapped into first coupling waveguide 235 by first polarizing coupler 236 and directed to first intensity detector 250, which monitors the power of the first reflected beam. Some of this remaining portion of the first reflected beam in second bus waveguide 232 can be tapped into second coupling waveguide 237 by second polarizing coupler 238 and directed to second beam stop 241.

The CW beams circulating in optical resonator 210 are coupled out of optical resonator 210 into first bus waveguide 217 at first coupler region 222 and directed to first optical circulator 214 through first optical filter 218. The CW beams are output from the third port of first optical circulator 214 into first output waveguide 224, which directs the CW beams to first rate detector 223 for further processing.

In addition, second broadband light source 204 emits a second light beam that is directed by second input waveguide 215 to the first port of second optical circulator 216. The second light beam is directed from the second port of second optical circulator 216 to second connecting waveguide 221, second optical filter 220, and first bus waveguide 217. A portion of the second light beam in first bus waveguide 217 is optically coupled into optical resonator 210 and propagates in a CW direction as a first CW beam. A beam portion of the first CW beam in optical resonator 210 is optically coupled into second bus waveguide 232 at second coupler region 228. This beam portion is directed by second bus waveguide 232 to second phase modulator 244, which provides a phase modulation or frequency shift to the beam portion. The second phase modulator 244 transmits the beam portion to second reflector 246 through second connector waveguide 234. The second reflector 246 reflects the beam portion back as a second reflected beam through second connector waveguide 234, to second phase modulator 244, and into second bus waveguide 232.

A portion of the second reflected beam is optically coupled at second coupler region 228 into optical resonator 210 in a CCW direction as a second CCW beam. Another portion of the second reflected beam in second bus waveguide 232 is tapped into second coupling waveguide 237 by second polarizing coupler 238 and directed to second intensity detector 252, which monitors the power of the second reflected beam. Some of this remaining portion of the second reflected beam in second bus waveguide 232 can be tapped into first coupling waveguide 235 by first polarizing coupler 236 and directed to first beam stop 239.

The CCW beams circulating in optical resonator 210 are coupled out of optical resonator 210 into first bus waveguide 217 at first coupler region 222 and directed to second optical circulator 216 through second optical filter 220. The CCW beams are output from the third port of second optical circulator 216 into second output waveguide 226, which directs the CCW beams to second rate detector 225 for further processing.

Interference between the outputs of the first and second rate detectors 223 and 225 is avoided by use of the first and second optical filters 218 and 220. For example, second optical filter 220 is configured to filter out the first light beam at the first wavelength from first broadband light source 202. The first optical filter 218 is configured to filter out the second light beam at the different second wavelength from second broadband light source 204. The optical filter 218 is a bandpass optical filter that only allows the light from first broadband light source 202 to pass through, while blocking the light from second broadband light source 204. The optical filter 220 is a bandpass optical filter that only allows the light from second broadband light source 204 to pass through, while blocking the light from first broadband light source 202.

The rotation of gyroscope 200 causes a resonance frequency shift between the CW and CCW beams output by optical resonator 210. The resonance frequency shift leads to optical power reduction after a round trip, which is detected by the first and second rate detectors 223, 225. A rate calculation unit can be used to calculate a rotation rate for gyroscope 200 based on received signals from the first and second rate detectors 223, 225. The outputs of first and second rate detectors 223, 225 can be used to calculate a rotation rate that is corrected for errors due to a time varying pathlength change in optical resonator 210.

Each of first and second broadband light sources 202, 204 can be used to measure the rotation rate individually. The first and second broadband light sources 202, 204 are configured to measure the rotation rate with an opposite sign. For example, the CW beam from one light source and the CCW beam from the other light source pass through optical resonator 210 simultaneously. Most bias errors are made to be common while maintaining sensitivity to rotation rate, which has the opposite sign between the two light sources. Therefore, bias errors can be eliminated by common error subtraction.

Example Embodiments

Example 1 includes a gyroscope comprising: a first light source configured to emit a first light beam with a broadband spectrum, and a second light source configured to emit a second light beam with a broadband spectrum; a first waveguide arrangement in optical communication with the first and second light sources; an optical resonator having a first side and an opposing second side, the optical resonator in optical communication with the first waveguide arrangement on the first side, the optical resonator configured to receive the first and second light beams through the first waveguide arrangement; a second waveguide arrangement in optical communication with the optical resonator on the second side thereof; a first phase modulator in optical communication with the optical resonator through the second waveguide arrangement, and a first reflector optically coupled with the first phase modulator; a second phase modulator in optical communication with the optical resonator through the second waveguide arrangement, and a second reflector optically coupled with the second phase modulator; a first optical circulator optically coupled to the first waveguide arrangement between the first light source and the first side of the optical resonator, and a second optical circulator optically coupled to first waveguide arrangement between the second light source and the first side of the optical resonator; and a first rate detector in optical communication with the optical resonator through the first optical circulator, and a second rate detector in optical communication with the optical resonator through the second optical circulator; wherein the first and second rate detectors are operative to produce respective first and second rate measurements based on a detected resonance frequency shift of the beams in the optical resonator caused by rotation of the gyroscope; wherein outputs of the first and second rate detectors are used to calculate a rotation rate that is corrected for errors due to a time varying pathlength change in the optical resonator.

Example 2 includes the gyroscope of Example 1, wherein a portion of the first light beam is optically coupled into the optical resonator from the first waveguide arrangement and propagates in a counterclockwise (CCW) direction as a first CCW beam, and a portion of the second light beam is optically coupled into the optical resonator from the first waveguide arrangement and propagates in a clockwise (CW) direction as a first CW beam.

Example 3 includes the gyroscope of Example 2, wherein: the first CCW beam is coupled out of the optical resonator into the second waveguide arrangement and directed to the first phase modulator and the first reflector, which respectively modulate and reflect the CCW beam as a first reflected beam back along the second waveguide arrangement, which optically couples the first reflected beam into the optical resonator to propagate in the CW direction as a second CW beam in the optical resonator; and the CW beam is coupled out of the optical resonator into the second waveguide arrangement and directed to the second phase modulator and the second reflector, which respectively modulate and reflect the CW beam as a second reflected beam back along the second waveguide arrangement, which optically couples the second reflected beam into the optical resonator to propagate in the CCW direction as a second CCW beam in the optical resonator.

Example 4 includes the gyroscope of Example 3, wherein: the second CW beam is coupled out of the optical resonator and directed to the first rate detector by the first optical circulator; and the second CCW beam is coupled out of the optical resonator and directed to the second rate detector by the second optical circulator.

Example 5 includes the gyroscope of Example 4, further comprising: a first intensity detector in optical communication with the second waveguide arrangement through a first polarizing coupler; and a second intensity detector in optical communication with the second waveguide arrangement through a second polarizing coupler.

Example 6 includes the gyroscope of Example 5, wherein: a portion of the first reflected beam is directed to the first intensity detector by the first polarizing coupler, wherein the first intensity detector monitors a power of the first reflected beam; and a portion of the second reflected beam is directed to the second intensity detector by the second polarizing coupler, wherein the second intensity detector monitors a power of the second reflected beam.

Example 7 includes the gyroscope of Example 6, further comprising: a first low frequency phase modulator optically coupled to the second waveguide arrangement between the first phase modulator and the first polarizing coupler; and a second low frequency phase modulator optically coupled to the second waveguide arrangement between the second phase modulator and the second polarizing coupler.

Example 8 includes the gyroscope of any of Examples 4-7, wherein: the first CCW beam is modulated at a first frequency by the first phase modulator; and the first CW beam is modulated at a second frequency by the second phase modulator, wherein the second frequency is different than the first frequency.

Example 9 includes the gyroscope of any of Examples 4-7, wherein the first and second light sources are configured to separately switch on and off at different times, such that the first and second rate measurements from the first and second rate detectors are separated by time.

Example 10 includes the gyroscope of any of Examples 4-7, further comprising: a first optical filter optically coupled to the first waveguide arrangement between the first optical circulator and the first side of the optical resonator; and a second optical filter optically coupled to the first waveguide arrangement between the second optical circulator and the first side of the optical resonator; wherein the second optical filter is configured to filter out a beam having a first wavelength, and the first optical filter is configured to filter out a beam having a second wavelength that is different than the first wavelength.

Example 11 includes the gyroscope of Example 10, wherein the first light source is configured to emit the first light beam at the first wavelength, and the second light source is configured to emit the second light beam at the second wavelength.

Example 12 includes the gyroscope of any of Examples 1-11, wherein the first and second light sources comprise amplified spontaneous emission devices, or superluminescent diodes.

Example 13 includes the gyroscope of any of Examples 1-12, wherein the optical resonator comprises a waveguide ring resonator.

Example 14 includes the gyroscope of any of Examples 1-12, wherein the optical resonator comprises a fiber ring resonator.

Example 15 includes the gyroscope of any of Examples 1-12, wherein the optical resonator comprises a planar waveguide ring resonator.

Example 16 includes the gyroscope of any of Examples 5-15, wherein the first waveguide arrangement comprises: a first input waveguide optically coupled between the first light source and a first port of the first optical circulator; a second input waveguide optically coupled between the second light source and a first port of the second optical circulator; a first bus waveguide optically coupled between a second port of first optical circulator and a second port of second optical circulator, wherein the first bus waveguide is optically coupled to the optical resonator at a first coupler region; a first output waveguide optically coupled between a third port of the first optical circulator and the first rate detector; and a second output waveguide optically coupled between a third port of the second optical circulator and the second rate detector.

Example 17 includes the gyroscope of Example 16, wherein the second waveguide arrangement comprises: a second bus waveguide optically coupled between the first phase modulator and the second phase modulator, wherein the second bus waveguide is optically coupled to the optical resonator at a second coupler region; a first connecting waveguide optically coupled between the first phase modulator and the first reflector; a second connecting waveguide optically coupled between the second phase modulator and the second reflector; a first coupling waveguide optically coupled to the second bus waveguide by the first polarizing coupler, wherein the first coupling waveguide is optically coupled to the first intensity detector; and a second coupling waveguide optically coupled to the second bus waveguide by the second polarizing coupler, wherein the second coupling waveguide is optically coupled to the second intensity detector.

Example 18 includes a gyroscope comprising: a first light source configured to emit a first light beam with a broadband spectrum, and a second light source configured to emit a second light beam with a broadband spectrum; a first waveguide arrangement in optical communication with the first and second light sources; an optical resonator having a first side and an opposing second side, the optical resonator in optical communication with the first waveguide arrangement on the first side, the optical resonator configured to receive the first and second light beams through the first waveguide arrangement; a second waveguide arrangement in optical communication with the optical resonator on the second side thereof; a first phase modulator in optical communication with the optical resonator through the second waveguide arrangement, and a first reflector optically coupled with the first phase modulator; a second phase modulator in optical communication with the optical resonator through the second waveguide arrangement, and a second reflector optically coupled with the second phase modulator; a first intensity detector in optical communication with the second waveguide arrangement through a first polarizing coupler, and a second intensity detector in optical communication with the second waveguide arrangement through a second polarizing coupler; a first optical circulator optically coupled to the first waveguide arrangement between the first light source and the first side of the optical resonator, and a second optical circulator optically coupled to the first waveguide arrangement between the second light source and the first side of the optical resonator; and a first rate detector in optical communication with the optical resonator through the first optical circulator, and a second rate detector in optical communication with the optical resonator through the second optical circulator; wherein a portion of the first light beam is optically coupled into the optical resonator from the first waveguide arrangement and propagates in a counterclockwise (CCW) direction as a first CCW beam, and a portion of the second light beam is optically coupled into the optical resonator from the first waveguide arrangement and propagates in a clockwise (CW) direction as a first CW beam; wherein the first CCW beam is coupled out of the optical resonator into the second waveguide arrangement and directed to the first phase modulator and the first reflector, which respectively modulate and reflect the CCW beam as a first reflected beam back along the second waveguide arrangement, which optically couples the first reflected beam into the optical resonator to propagate in the CW direction as a second CW beam in the optical resonator; wherein the first CW beam is coupled out of the optical resonator into the second waveguide arrangement and directed to the second phase modulator and the second reflector, which respectively modulate and reflect the CW beam as a second reflected beam back along the second waveguide arrangement, which optically couples the second reflected beam into the optical resonator to propagate in the CCW direction as a second CCW beam in the optical resonator; wherein the first phase modulator is configured to modulate the first CCW beam at a first frequency, and the second phase modulator is configured to modulate the first CW beam at a second frequency that is different than the first frequency; wherein the second CW beam is coupled out of the optical resonator and directed to the first rate detector by the first optical circulator, and the second CCW beam is coupled out of the optical resonator and directed to the second rate detector by the second optical circulator; wherein the first and second rate detectors are operative to produce respective first and second rate measurements based on a detected resonance frequency shift of the beams in the optical resonator caused by rotation of the gyroscope; wherein outputs of the first and second rate detectors are used to calculate a rotation rate that is corrected for errors due to a time varying pathlength change in the optical resonator.

Example 19 includes the gyroscope of Example 18, wherein: a portion of the first reflected beam is directed to the first intensity detector by the first polarizing coupler, wherein the first intensity detector monitors a power of the first reflected beam; and a portion of the second reflected beam is directed to the second intensity detector by the second polarizing coupler, wherein the second intensity detector monitors a power of the second reflected beam.

Example 20 includes the gyroscope of any of Examples 18-19, further comprising: a first low frequency phase modulator optically coupled to the second waveguide arrangement between the first phase modulator and the first polarizing coupler; and a second low frequency phase modulator optically coupled to the second waveguide arrangement between the second phase modulator and the second polarizing coupler.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A gyroscope comprising:
    a first light source configured to emit a first light beam with a broadband spectrum, and a second light source configured to emit a second light beam with a broadband spectrum;
    a first waveguide arrangement in optical communication with the first and second light sources;
    an optical resonator having a first side and an opposing second side, the optical resonator in optical communication with the first waveguide arrangement on the first side, the optical resonator configured to receive the first and second light beams through the first waveguide arrangement;
    a second waveguide arrangement in optical communication with the optical resonator on the second side thereof;
    a first phase modulator in optical communication with the optical resonator through the second waveguide arrangement, and a first reflector optically coupled with the first phase modulator;
    a second phase modulator in optical communication with the optical resonator through the second waveguide arrangement, and a second reflector optically coupled with the second phase modulator;
    a first optical circulator optically coupled to the first waveguide arrangement between the first light source and the first side of the optical resonator, and a second optical circulator optically coupled to first waveguide arrangement between the second light source and the first side of the optical resonator; and
    a first rate detector in optical communication with the optical resonator through the first optical circulator, and a second rate detector in optical communication with the optical resonator through the second optical circulator;
    wherein the first and second rate detectors are operative to produce respective first and second rate measurements based on a detected resonance frequency shift of the beams in the optical resonator caused by rotation of the gyroscope;
    wherein outputs of the first and second rate detectors are used to calculate a rotation rate that is corrected for errors due to a time varying pathlength change in the optical resonator.

2. The gyroscope of claim 1, wherein a portion of the first light beam is optically coupled into the optical resonator from the first waveguide arrangement and propagates in a counterclockwise (CCW) direction as a first CCW beam, and a portion of the second light beam is optically coupled into the optical resonator from the first waveguide arrangement and propagates in a clockwise (CW) direction as a first CW beam.

3. The gyroscope of claim 2, wherein:
    the first CCW beam is coupled out of the optical resonator into the second waveguide arrangement and directed to the first phase modulator and the first reflector, which respectively modulate and reflect the CCW beam as a first reflected beam back along the second waveguide arrangement, which optically couples the first reflected beam into the optical resonator to propagate in the CW direction as a second CW beam in the optical resonator; and
    the CW beam is coupled out of the optical resonator into the second waveguide arrangement and directed to the second phase modulator and the second reflector, which respectively modulate and reflect the CW beam as a second reflected beam back along the second waveguide arrangement, which optically couples the second reflected beam into the optical resonator to propagate in the CCW direction as a second CCW beam in the optical resonator.

4. The gyroscope of claim 3, wherein:
    the second CW beam is coupled out of the optical resonator and directed to the first rate detector by the first optical circulator; and
    the second CCW beam is coupled out of the optical resonator and directed to the second rate detector by the second optical circulator.

5. The gyroscope of claim 4, further comprising:
    a first intensity detector in optical communication with the second waveguide arrangement through a first polarizing coupler; and
    a second intensity detector in optical communication with the second waveguide arrangement through a second polarizing coupler.

6. The gyroscope of claim 5, wherein:
    a portion of the first reflected beam is directed to the first intensity detector by the first polarizing coupler, wherein the first intensity detector monitors a power of the first reflected beam; and a portion of the second reflected beam is directed to the second intensity detector by the second polarizing coupler, wherein the second intensity detector monitors a power of the second reflected beam.

7. The gyroscope of claim 6, further comprising:
a first low frequency phase modulator optically coupled to the second waveguide arrangement between the first phase modulator and the first polarizing coupler; and
a second low frequency phase modulator optically coupled to the second waveguide arrangement between the second phase modulator and the second polarizing coupler.

8. The gyroscope of claim 4, wherein:
the first CCW beam is modulated at a first frequency by the first phase modulator; and
the first CW beam is modulated at a second frequency by the second phase modulator, wherein the second frequency is different than the first frequency.

9. The gyroscope of claim 4, wherein the first and second light sources are configured to separately switch on and off at different times, such that the first and second rate measurements from the first and second rate detectors are separated by time.

10. The gyroscope of claim 4, further comprising:
a first optical filter optically coupled to the first waveguide arrangement between the first optical circulator and the first side of the optical resonator; and
a second optical filter optically coupled to the first waveguide arrangement between the second optical circulator and the first side of the optical resonator;
wherein the second optical filter is configured to filter out a beam having a first wavelength, and the first optical filter is configured to filter out a beam having a second wavelength that is different than the first wavelength.

11. The gyroscope of claim 10, wherein the first light source is configured to emit the first light beam at the first wavelength, and the second light source is configured to emit the second light beam at the second wavelength.

12. The gyroscope of claim 1, wherein the first and second light sources comprise amplified spontaneous emission devices, or superluminescent diodes.

13. The gyroscope of claim 1, wherein the optical resonator comprises a waveguide ring resonator.

14. The gyroscope of claim 1, wherein the optical resonator comprises a fiber ring resonator.

15. The gyroscope of claim 1, wherein the optical resonator comprises a planar waveguide ring resonator.

16. The gyroscope of claim 5, wherein the first waveguide arrangement comprises:
a first input waveguide optically coupled between the first light source and a first port of the first optical circulator;
a second input waveguide optically coupled between the second light source and a first port of the second optical circulator;
a first bus waveguide optically coupled between a second port of first optical circulator and a second port of second optical circulator, wherein the first bus waveguide is optically coupled to the optical resonator at a first coupler region;
a first output waveguide optically coupled between a third port of the first optical circulator and the first rate detector; and
a second output waveguide optically coupled between a third port of the second optical circulator and the second rate detector.

17. The gyroscope of claim 16, wherein the second waveguide arrangement comprises:

a second bus waveguide optically coupled between the first phase modulator and the second phase modulator, wherein the second bus waveguide is optically coupled to the optical resonator at a second coupler region;
a first connecting waveguide optically coupled between the first phase modulator and the first reflector;
a second connecting waveguide optically coupled between the second phase modulator and the second reflector;
a first coupling waveguide optically coupled to the second bus waveguide by the first polarizing coupler, wherein the first coupling waveguide is optically coupled to the first intensity detector; and
a second coupling waveguide optically coupled to the second bus waveguide by the second polarizing coupler, wherein the second coupling waveguide is optically coupled to the second intensity detector.

18. A gyroscope comprising:
a first light source configured to emit a first light beam with a broadband spectrum, and a second light source configured to emit a second light beam with a broadband spectrum;
a first waveguide arrangement in optical communication with the first and second light sources;
an optical resonator having a first side and an opposing second side, the optical resonator in optical communication with the first waveguide arrangement on the first side, the optical resonator configured to receive the first and second light beams through the first waveguide arrangement;
a second waveguide arrangement in optical communication with the optical resonator on the second side thereof;
a first phase modulator in optical communication with the optical resonator through the second waveguide arrangement, and a first reflector optically coupled with the first phase modulator;
a second phase modulator in optical communication with the optical resonator through the second waveguide arrangement, and a second reflector optically coupled with the second phase modulator;
a first intensity detector in optical communication with the second waveguide arrangement through a first polarizing coupler, and a second intensity detector in optical communication with the second waveguide arrangement through a second polarizing coupler;
a first optical circulator optically coupled to the first waveguide arrangement between the first light source and the first side of the optical resonator, and a second optical circulator optically coupled to the first waveguide arrangement between the second light source and the first side of the optical resonator; and
a first rate detector in optical communication with the optical resonator through the first optical circulator, and a second rate detector in optical communication with the optical resonator through the second optical circulator;
wherein a portion of the first light beam is optically coupled into the optical resonator from the first waveguide arrangement and propagates in a counterclockwise (CCW) direction as a first CCW beam, and a portion of the second light beam is optically coupled into the optical resonator from the first waveguide arrangement and propagates in a clockwise (CW) direction as a first CW beam;
wherein the first CCW beam is coupled out of the optical resonator into the second waveguide arrangement and directed to the first phase modulator and the first reflector, which respectively modulate and reflect the CCW beam as a first reflected beam back along the second waveguide arrangement, which optically couples the first reflected beam into the optical resonator to propagate in the CW direction as a second CW beam in the optical resonator;

wherein the first CW beam is coupled out of the optical resonator into the second waveguide arrangement and directed to the second phase modulator and the second reflector, which respectively modulate and reflect the CW beam as a second reflected beam back along the second waveguide arrangement, which optically couples the second reflected beam into the optical resonator to propagate in the CCW direction as a second CCW beam in the optical resonator;

wherein the first phase modulator is configured to modulate the first CCW beam at a first frequency, and the second phase modulator is configured to modulate the first CW beam at a second frequency that is different than the first frequency;

wherein the second CW beam is coupled out of the optical resonator and directed to the first rate detector by the first optical circulator, and the second CCW beam is coupled out of the optical resonator and directed to the second rate detector by the second optical circulator;

wherein the first and second rate detectors are operative to produce respective first and second rate measurements based on a detected resonance frequency shift of the beams in the optical resonator caused by rotation of the gyroscope;

wherein outputs of the first and second rate detectors are used to calculate a rotation rate that is corrected for errors due to a time varying pathlength change in the optical resonator.

19. The gyroscope of claim 18, wherein:

a portion of the first reflected beam is directed to the first intensity detector by the first polarizing coupler, wherein the first intensity detector monitors a power of the first reflected beam; and a portion of the second reflected beam is directed to the second intensity detector by the second polarizing coupler, wherein the second intensity detector monitors a power of the second reflected beam.

20. The gyroscope of claim 18, further comprising:

a first low frequency phase modulator optically coupled to the second waveguide arrangement between the first phase modulator and the first polarizing coupler; and a second low frequency phase modulator optically coupled to the second waveguide arrangement between the second phase modulator and the second polarizing coupler.

* * * * *